United States Patent [19]

Guttinger

[11] 4,002,114

[45] Jan. 11, 1977

[54] HYDRAULIC DUAL-BELT PRESS AND CONTROL

[75] Inventor: Manfred Guttinger, Leinfelden, Germany

[73] Assignee: Sandco Limited, Ottawa, Canada

[22] Filed: Apr. 29, 1975

[21] Appl. No.: 572,937

[30] Foreign Application Priority Data

May 7, 1974 Germany .......................... 2421955

[52] U.S. Cl. .................................. 100/49; 100/51; 100/118; 100/153; 425/136; 425/145; 425/149; 425/371

[51] Int. Cl.² .................... B30B 15/16; B29C 3/06; B29C 15/00

[58] Field of Search ......................... 100/43, 48–52, 100/118–120, 151–154; 425/141–149, 136, 363, 335, 371; 144/281 B

[56] References Cited

UNITED STATES PATENTS

| | | | |
|---|---|---|---|
| 2,646,745 | 7/1953 | Seltzer | 100/49 |
| 3,557,403 | 1/1971 | Lemelson | 425/147 X |
| 3,594,866 | 7/1971 | Skinner et al. | 425/163 |
| 3,706,516 | 12/1972 | Kisteneich et al. | 425/141 |
| 3,885,901 | 5/1975 | Reiners | 425/371 |
| 3,907,473 | 9/1975 | DeMets | 425/141 |
| 3,942,929 | 3/1976 | DeMets | 425/371 |

*Primary Examiner*—Peter Feldman

*Attorney, Agent, or Firm*—Harold L. Stults

[57] ABSTRACT

A dual press having hydraulic units which are controlled to regulate the pressure exerted on material being treated. A control system includes sensing means along the path of materials passing to the press and sensing means along the path of materials passing from the press. Thus, sensing means control the hydraulic units and regulate the pressure so as to maintain a predetermined maximum pressure when a continuous supply of material is passing through the press. The pressure is reduced or removed completely when the supply of material is decreased or interrupted.

10 Claims, 1 Drawing Figure

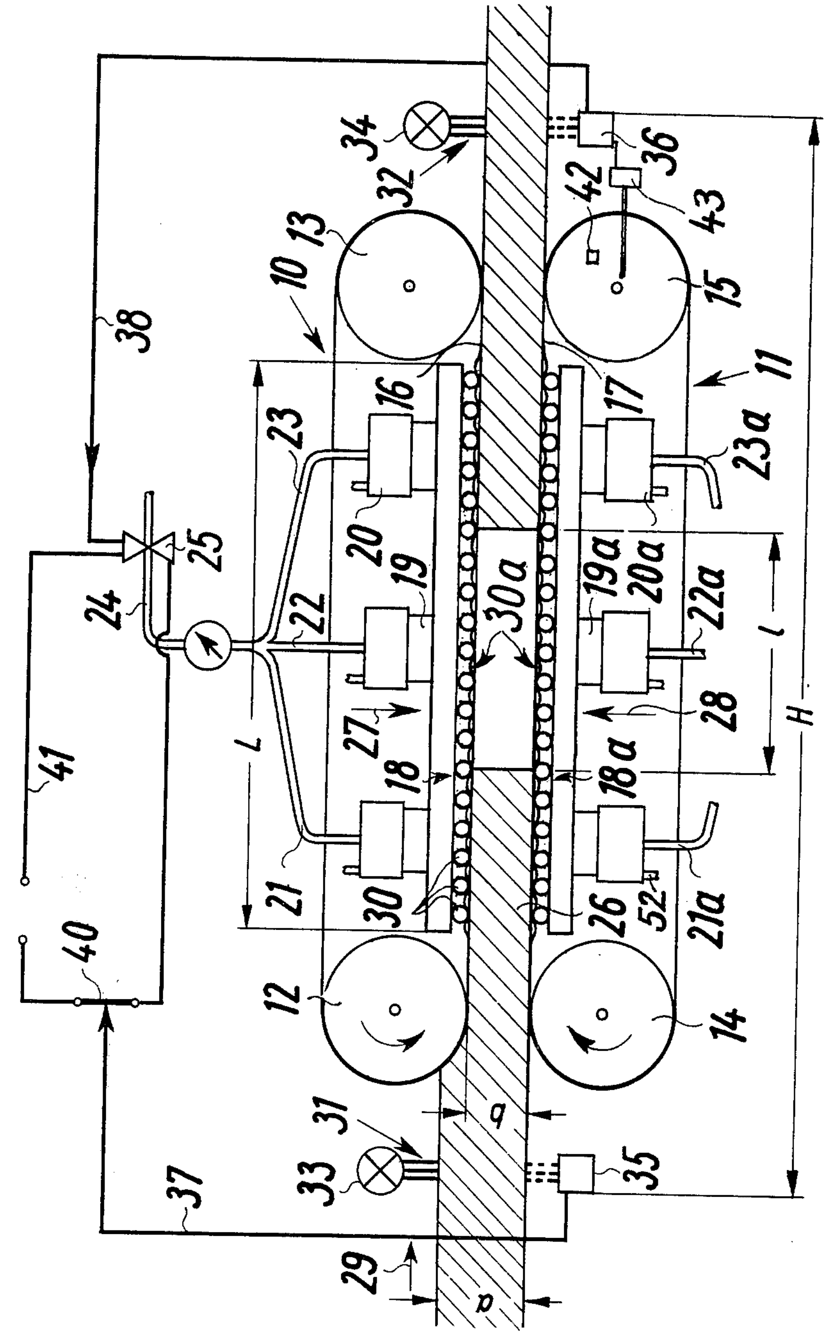
10
11
12
13
14
15
16
17
18
18a
19
19a
20
20a
21
21a
22
22a
23
23a
24
25
26
27
28
29
30
30a
31
32
33
34
35
36
37
38
40
41
42
43
52
L
l
H
p
q

HYDRAULIC DUAL-BELT PRESS AND CONTROL

The invention relates to a belt press, and more in particular to a hydraulic dual-belt press, for material to be treated continuously.

Dual-belt presses are used for maintaining materials under predetermined constant pressure with or without a heat treatment of the material. The material may be fruits, for example, which must be dewatered, or a continuous layer or strip of material which must be pressed to a certain density, as in the case of chipboard manufacture.

The dual-belts are usually made of high-grade steel, and are subjected to pressure on one side by pressure members or plates which are hydraulically operated and which may be provided with rollers to eliminate friction between the belt and the plates. The total forces exerted on the belt through the plates is distributed upon the area of the material passing through the press. Any interruption of the flow of material will give rise to greatly increased loading of the belt by the rollers, and this will set up objectionable variations in the tensile and bending stresses in the belt which may eventually result in premature belt fatigue and eventual failure. Interruptions in the flow of material will occur, for example, when the tail end of one continuous length of the material to be treated has already passed through the belt press and the leading end of the next continuous length does not immediately follow it. However, similar conditions may also occur when there is an interruption in the uniform flow pattern, even with a continuous length of the material, e.g., distribution or pretreatment of the material. With a view to avoiding the mentioned one-sided loading of the belt it is essential that the pressure on the belt be relieved immediately when such interruptions in the uniform flow pattern of material occur. In the past, this was done by an operator who constantly watched the flow of material and when necessary shut off the belt-press pressure manually. When the operator has been dispensed with, the known consequences were tolerated.

It is the object of the present invention to automate the belt pressure-relieving procedure in the situations outlined, thereby doing away with the need for an operator while preventing needless damage to the belt.

With a view to attaining this object, it is proposed, in accordance with the basic concept of the invention, that there be disposed ahead of the inlet and after the outlet of the belt press two sensing devices which control the belt-press pressure as a function of the flow of material in such a way that when the uniform even flow is interrupted ahead of and/or after the belt press the belt pressure is controlled properly, and reduced to zero when desirable. A time-delay device is associated with the sensing devices so that upon resumption of the flow of material the belt pressure is again increased only when material is again present in the treatment zone, with the full pressure being exerted again only when a length corresponding to at least the full effective belt length is located within the belt press.

By way of advantageously developing the basic concept of the invention, in the illustrative embodiment, photoelectric control units are used as sensing devices, each such unit consisting of a light source disposed on one side of the flow of material and a photocell disposed opposite it on the other side of the material flow.

The photoelectric control units permit contact-free sensing of the material to be treated. Also, translation of the sensing information from the photocells into a given pressure by the hydraulic press is advantageously effected by having the current produced by the photocell actuate, possibly through an amplifier or an auxiliary electric circuit, valves controlling the flow of hydraulic fluid within the hydraulic system.

A time-delay relay in the electric circuit of the sensing device, preferably a photocell, may serve as the time-delay device. Further, the belt press may not always be operated at the same belt speed, so that in a given case the belt speed is adjusted to the material being treated. It is apparent that in such cases there are variations in the time which will elapse to permit a continuous length of material to move completely into the press. In order to provide for such situations, the invention contemplates that the delay device may be controlled as a function of the belt speed of the belt press. In accordance with another embodiment of the invention, it is proposed to include in the electric circuit energized by the sensing device, a switch which closes upon interruption of the flow of material, and which reopens upon resumption of the flow of material at the first sensing device only after a predetermined interval of time that is a function of the particular belt speed. In the illustrative embodiment, the switch is operated by a counter unit after a fixed number of pulses, and the counter receives pulses from a pulse unit which has an operative relationship with an end pulley of the belt, or with driving means for the pulley. The illustrative pulses unit has a magnet or cam which drives a pulse counter that will open the switch after a fixed number of pulses.

The single FIGURE of the drawing is a diagrammatic side elevation of a dual-belt press constituting one embodiment of the invention.

In the drawing, a dual-belt press 2 has an upper belt 10 and a lower belt 11 mounted respectively upon end pulleys 12 and 13 and 14 and 15. The drives for belts 10 and 11 is not a subject matter of the present invention and a conventional electric motor drive for pulleys 13 and 15 which is not shown. The lower run 16 of the upper belt 10 and the upper run 17 of the lower belt 11 are pressed together over a length L by pressure plates 18 and 18*a*, respectively. The pressure plates are actuated hydraulically by three hydraulic units attached by their pistons attached to each of the plates, there being hydraulic pistons 19 and 19*a*, respectively for plates 18 and 18*a* which are slidably disposed in hydraulic cylinders 20 and 20*a*, respectively. Pressure is supplied to the cylinders through lines 21, 22 and 23 and 21*a*, 22*a* and 23*a*, respectively, which branch off from a common hydraulic line 24. The admission of hydraulic fluid to the cylinders is controlled by a valve 25, To relieve the pressure of the hydraulic cylinders 20 and 20*a*, appropriate return lines 52 are provided which permit the hydraulic fluid to flow from the hydraulic cylinders at a controlled rate into an accumulator (not shown). The return lines discharge into a common return line having a control valve therein which is operated in the same manner as valve 25.

Between the lower run 16 of the upper belt 10 and the upper run 17 of the lower belt 11 there is a continuous layer or strip 26 of the material being treated, i.e., chipboard material. The direction of travel of strip 26 is indicated by an arrow 29. It enters at the end pulleys 12 and 14 and is discharged beyond end pulleys 13 and 15 in fully compressed condition. Pulleys 12 and 14 and pressure plates 18 and 18*a* exert pressure from both sides of strip 26 in the direction of the arrows 27 and 28, respectively, thus compressing the strip 26 from an initial thickness *a* to a final thickness b. Belts 10 and 11 are of high-grade steel and there are disposed between each of the pressure plates 18 and 18*a* and its belt 10 or 11, a continuous array of rollers 30 which are supported on the pressure plates 18 and 18*a*. Rollers 30 extend the width of the belts, and at each edge of the belts the rollers are attached together in a known manner by an endless chain (not shown), with each end of each roller connected to the adjacent chain by a swivel. Hence, the rollers are free to roll along the surface of the adjacent plates 18 or 18*a*, and the rollers are held parallel by the chains. For simplicity, the rollers 30 are shown only as they pass along the pressure plates 18 and 18*a*. At the right-hand edges of plates 18 and 18*a*, the rollers move away from their respective belts, and move back to the left and back toward the belts and around the left-hand edges of the pressure plates and onto the plates again.

When the plates 18 and 18*a* are subjected to full pressure and the entire length L is occupied by layer 26, a pressure is created between the individual rollers 30 and belts 10 and 11 which is proportional to the force exerted by the hydraulic system divided by the area along the length L of pressure plates 18 and 18*a*. However, assume that an interruption occurs in the feeding of material to the press so that there is a break in the continuous strip 26 of material with a resultant decrease in the area which is occupied by material between the belts along length L. If the force exerted by plates 18 and 18*a* remains the same while that interruption occurs, that force will be distributed over the reduced area of the strip of material. That would produce an increase in the pressure exerted on a unit area of the strip with the pressure-increase factor being proportional to the reduction of that area. Also, each roller exerts its pressure on a strip of the belt at the top of the roller, and there is a strip of the belt between each roller and the next which is not then being pressed by a roller. The pressure exerted by each roller is limited by the load-bearing capacity of the belts, and the force exerted by the hydraulic system therefore is regulated accordingly. Hence, an interruption in feeding of material could lead to local overloading of the belts 10 and 11 at the rollers 30, and particularly at the interstices 30*a* between the individual rollers 30, where considerable alternating flexing or bending would occur. That would cause fatigue of the metal and would materially reduce the belt life.

In accordance with the present invention, when such interruptions occur, as in the flow of material, the hydraulic pressure on pressure plates 18 and 18*a* is reduced so that the runs of the belts are no longer under pressure. For automation of this process, two sensing units 31 and 32 are provided along the path of the material, unit 31 being ahead of or upstream of the press and unit 32 being downstream of the press. Unit 31 consists of a light source 33 disposed above the material strip 26 and of a photocell 35 disposed below the material. Unit 32 is similar with a light source 34 above the strip and a photocell 36 below. Photocells 35 and 36 control the admission of hydraulic fluid to the hydraulic cylinders 20 and 20*a*, respectively, or the relief of pressure therein, respectively, as shown schematically by the connecting lines 37 and 38. The actuating organs of the pressure valve 25 (and of the pressure-relief valve which is not shown) are connected to an auxiliary electric circuit 41, operable by means of a switch 40.

When there is an unbroken beam of light at sensing unit 31, a current is produced in photocell 35 which closes switch 40 and completes the auxiliary circuit 41. That closes the pressure fluid valve 25 and simultaneously opens the relief valve (not shown), so that the hydraulic cylinders 20 and 20*a* move away from belts 16 and 17, thus relieving the pressure on the belts. A similar auxiliary circuit with a circuit and switch (like 41 and 40) and a valve like 25 is provided for the sensing unit 32. Other means to produce appropriate amplification of the current produced by the photocells 35 and 36, are provided for the control of the pressure fluid and pressure-relief valves, although under some conditions it is possible to have the valve actuated directly by the current produced by photocells. When the material is not a continuous length but is bulk material, the photocells and their light sources may be in horizontal alignment so that they monitor the flow horizontally rather than vertically.

So long as the light beams are broken by the flow of material, as in the case with the embodiment shown, no current is produced by the photocells 35 and 36 so that valve 25 remains open and the pressure-relief valve (not shown) remains closed and the hydraulic cylinders 20 and 20*a* in the normal case are subjected to full pressure. Now when the continuous flow of material is interrupted, for example, at the end of a continuous length to be treated, the light beam, up to now broken, is directed to photocell 35. At that instant the photocell 35 produces a current which acts through switch 40 and auxiliary circuit 41 (and when desirable through an amplifier), to close valve 25 and to open the pressure-relief valve (not shown), with the result that the pressure on belts 16 and 17 is relieved. Once the end of the continuous length has also passed the second sensing unit 32, the light beam is restored there, too, which has the effect that a current acting upon said valves is produced also by photocell 36. Thus the belts 16 and 17 will continue to be relieved of pressure even if in the meantime a new continuous length 26 should have passed the first sensing device 33.

However, pressure relief for the belt sides 16 and 17 must be provided also in the event that, as shown in the embodiment, the tail end of the first continuous length is still inside the belt process after the head or leading end of a new continuous length has entered the press. Normally an interruption of the light-beam arrangement 33 to 35 would result in the immediate opening of switch 40. The circuit 41 would then be open and the pressure valve 25 would reopen while the relief valve (not shown) would simultaneously close. However, a time delay device is provided which upon the entry of a new continuous length into the belt press prevents the switch 40 from opening until the leading end of the entering strip has passed completely through the belt press, that is to say, until material is again present over the entire length L between the two belts. The delay device has a cam 42 mounted upon end pulley 15 so as to rotate with it, and the cam actuates a pulse counter 43 once for every revolution of the end pulley. After switch 40 has been closed by the action of photocell 35, it is held closed until cam 42 has produced the predetermined number of pulses which corresponds to the movement of the strip in the press at least to the end of the distance L. The pulse counter then allows the switch 40 to open. Only then will the valve 25 open (and the relief valve close), and belts 16 and 17 will then again be subjected to full pressure. In place of the mechanically operating cam 42, a magnet acting upon a suitable pulse counter may be provided.

It is understood that the invention contemplates that modifications may be made in the illustrative embodiment and that other embodiments may be made within the scope of the claims.

What is claimed is:

1. In a dual-belt press for exerting controlled pressure upon a continuous strip of material passing through a treatment zone, control means which includes sensing means which senses the flow of the strip of material toward said treatment zone and pressure-control means to control the pressure exerted by the press and which responds to an interruption in said flow of material when sensed by said sensing means to reduce said pressure exerted by the press, said control means including means to restore said pressure exerted by the press to a predetermined value upon the resumption of said flow of material as sensed by said sensing means and including means to prevent said restoring of said pressure until a continuous strip of material has moved toward the press passed said sensing means having a length sufficient to extend from said sensing means through said treatment zone.

2. A press as defined in claim 1, said sensing means comprises a photoelectric control unit which consists of a light source disposed on one side of the path of flow of material and a photocell disposed opposite it on the other side of said path.

3. A press as defined in claim 2 which includes a hydraulic press which exerts said pressure, and valve means controlling the flow of hydraulic fluid to said hydraulic press and controlled by said photocell.

4. A press as defined in claim 1, which includes time-delay means disposed in the electric circuit of said sensing means.

5. A press as defined in claim 4, wherein said time-delay means is controlled as a function of the belt speed of the press.

6. A press as defined in claim 4 said electric circuit includes a switch which is closed upon an interruption in the flow of material and which reopens in response to resumption of said flow past said sensing means, and means to which permits such reopening of said switch only after a definite time interval that is a function of the particular belt speed.

7. A press as defined in claim 6 wherein said means which permits reopening of said switch comprises a pulse-counting relay, and wherein said press includes a pulley around which one of said belts passes, and means to produce pulses and transmit them to said pulse-counting relay as a function of the rotation of said pulley.

8. A press as defined in claim 7 which includes means mounted on said pulley to rotate therewith, and pulse-producing means to produce pulses by the rotary movement of said last-name means with said pulley.

9. The combination of, a dual-belt press having two belts with spaced parallel runs having between them a treatment zone for a continuous strip of material to be treated, a press including pressure plates on the opposite sides of said runs of said belts and adapted to exert pressure urging said belts against the opposite sides of the strip of material within said treatment zone, first sensing means to determine that a strip of material is passing towards said treatment zone, second sensing means to determine that a strip of material is passing from said treatment zone, means to remove the pressure exerted by said pressure plates when said first sensing means determines that there has been an interruption in the passing of the strip of material toward said treatment zone, means to initiate the restoring of the pressure exerted by said pressure plates when said second sensing means determines that the leading end of a strip of material is passing from said treatment zone, and relay means which prevents said restoring of said pressure for a period of time after the leading end of an additional strip of material has passed said first sensing means.

10. The combination described in claim 9 which includes a continuous array of rollers positioned between each of said pressure plates and the adjacent belt run.

* * * * *